(12) United States Patent
King

(10) Patent No.: US 9,591,115 B2
(45) Date of Patent: Mar. 7, 2017

(54) SYSTEM AND METHOD OF CONTACT IDENTIFICATION DISSEMINATION

(71) Applicant: Interactive Intelligence Group, Inc., Indianapolis, IN (US)

(72) Inventor: Kevin Elliott King, Bargersville, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 15/169,047

(22) Filed: May 31, 2016

(65) Prior Publication Data

US 2016/0360017 A1 Dec. 8, 2016

Related U.S. Application Data

(60) Provisional application No. 62/169,596, filed on Jun. 2, 2015.

(51) Int. Cl.
*H04M 1/56* (2006.01)
*H04M 15/00* (2006.01)
*H04M 1/2745* (2006.01)
*H04L 29/08* (2006.01)

(52) U.S. Cl.
CPC .. *H04M 1/274516* (2013.01); *H04L 67/1097* (2013.01)

(58) Field of Classification Search
CPC ..... H04L 61/106; H04M 3/51; H04M 3/5166; H04M 3/5191; H04M 3/523; H04M 3/42059; H04M 3/42348; H04M 7/0003; H04M 7/0021; H04M 3/5175; H04Q 3/0029; H04Q 2213/13072; H04Q 2213/13107; H04Q 2213/1328; H04Q 2213/13353; H04Q 2213/13377; G06Q 30/016; G06Q 30/0201; G06Q 30/0267
USPC ......... 379/90.01, 92.03, 93.01, 93.17, 93.23, 379/142.01, 142.04, 142.06, 142.07, 379/142.09, 142.15, 142.17, 265.01, 379/265.02, 265.09, 265.11, 261, 267, 379/309; 370/352, 353, 355, 357
See application file for complete search history.

(56) References Cited

U.S. PATENT DOCUMENTS 7,187,662 B1 * 3/2007 Klingman ................ H04Q 3/64
370/270
9,160,851 B2 * 10/2015 Kugler ............... G06Q 30/0201
9,338,289 B1 * 5/2016 Goyal ............... H04M 3/42059
(Continued)

OTHER PUBLICATIONS

International Search Report and Written Opinion of the International Searching Authority mailed Aug. 31, 2016 in related PCT application PCT/US16/35048, international filing date May 31, 2016.

*Primary Examiner* — Binh Tieu

(57) ABSTRACT

A system and method are presented for contact identification dissemination among devices within a hybrid cloud distributed system. Information associated with a first party device is provided to a cloud managed telephony network appliance. The appliance communicates with a cloud application and is capable of communication with any other appliances which may be associated with a second party device, if that appliance is not already associated with the second party device. Information between the components in the system may be asynchronously updated in order to provide first party information and more granular matches.

19 Claims, 5 Drawing Sheets

(56) References Cited

U.S. PATENT DOCUMENTS

2008/0267387 A1* 10/2008 Strathmeyer ........... H04M 3/51
  379/265.09
2012/0185307 A1    7/2012  Bookstaff
2013/0061306 A1    3/2013  Sinn
2014/0244851 A1    8/2014  Lee

* cited by examiner

SYSTEM AND METHOD OF CONTACT IDENTIFICATION DISSEMINATION

REFERENCE TO RELATED APPLICATION

The present application claims priority to U.S. provisional patent application 62/169,596, filed on Jun. 2, 2015, and titled SYSTEM AND METHOD OF CONTACT IDENTIFICATION DISSEMINATION.

BACKGROUND

The present invention generally relates to telecommunications systems and methods, as well as telecommunications devices. More particularly, the present invention pertains to information passing within telecommunications system.

SUMMARY

A system and method are presented for contact identification dissemination among devices within a hybrid cloud distributed system. Information associated with a first party device is provided to a cloud managed telephony network appliance. The appliance communicates with a cloud application and is capable of communication with any other appliances which may be associated with a second party device, if that appliance is not already associated with the second party device. Information between the components in the system may be asynchronously updated in order to provide first party information and more granular matches.

In one embodiment, a method is presented for disseminating information associated with a first telecommunications device, wherein the first telecommunications device is associated with a first party in a telecommunications system, wherein the system further comprises a network coupling a plurality of cloud managed telephony network appliances, a cloud managed application, and a second telecommunications device associated with a second party, the method comprising the steps of: providing, by a telephony device carrier associated with the first telecommunications device associated with the first party, information associated with the telecommunications device to a first cloud managed telephony network appliance; notifying, by the first cloud managed telephony network appliance, the cloud application of the information; relaying, by the first cloud managed telephony network appliance, the information to a second cloud managed telephony network appliance; storing, by the second cloud managed telephony network appliance, the information provided by the first cloud managed telephony network appliance, and optionally notifying the cloud application; relaying, by the second cloud managed telephony network appliance, the provided information to the second telecommunications device associated with the second party; performing, by the Cloud application, a data store lookup on the provided information for existing records, wherein if there are existing records, confirming the provided information with existing records, and wherein, if information does not match, providing by the cloud application, an update to the first cloud managed telephony network appliance; and sending, by the cloud application, information to a display associated with the second telecommunications device.

In another embodiment, a method for disseminating information associated with a first telecommunications device, wherein the first telecommunications device is associated with a first party in a telecommunications system, wherein the system further comprises a network coupling a cloud managed telephony network appliance, a cloud managed application, and a second telecommunications device associated with a second party, the method comprising the steps of: providing, by a telephony device carrier associated with the first telecommunications device associated with the first party, information associated with the telecommunications device to a cloud managed telephony network appliance; notifying, by the cloud managed telephony network appliance, the cloud application of the information; storing, by the cloud managed telephony network appliance, the information; relaying, by the cloud managed telephony network appliance, the provided information to the second telecommunications device associated with the second party; performing, by the cloud managed telephony network appliance, a data store lookup on the provided information for existing records, wherein if there are existing records, confirming the provided information with the existing records, and wherein, if the information does not match the existing records, providing, by the cloud application, an update to the cloud managed telephony network appliance; relaying, by the cloud managed telephony network appliance, the update to the second telecommunications device; and sending, by the cloud application, information to a display associated with the second telecommunications device.

DETAILED DESCRIPTION

Figure 1:
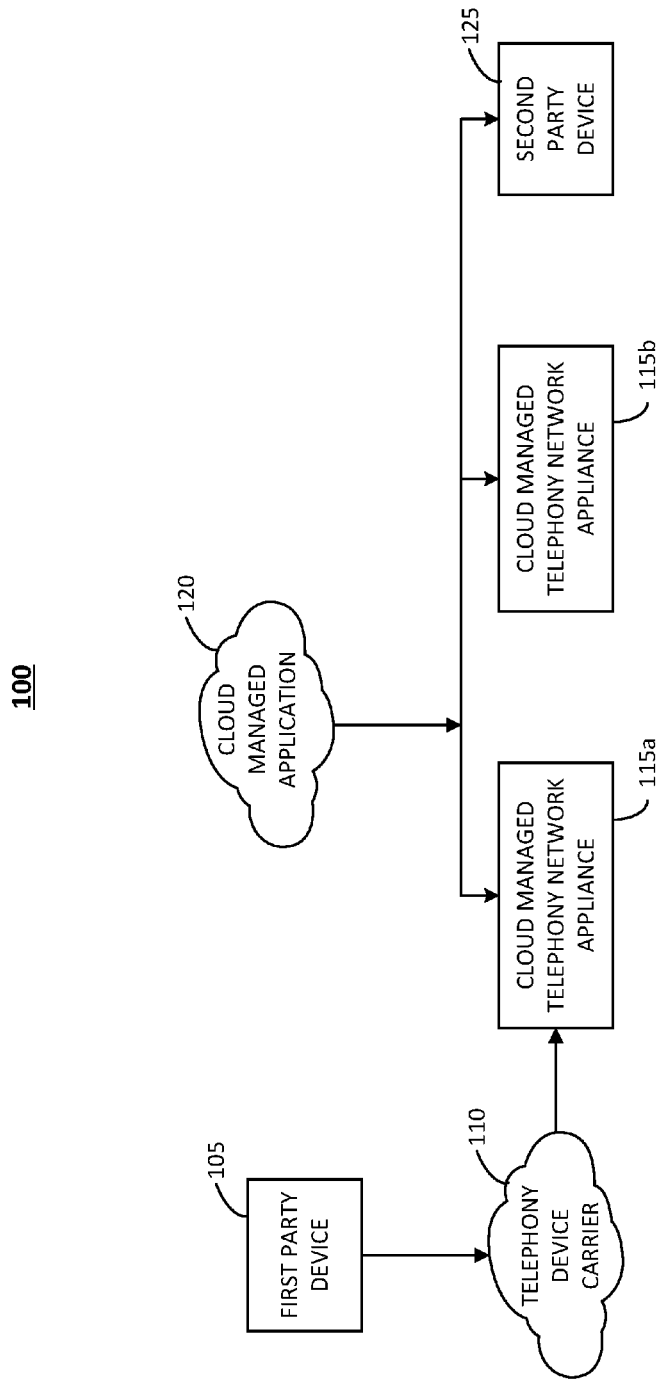
FIG. 1 is a diagram illustrating a hybrid cloud distributed system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Telephony applications are increasingly becoming cloud-based, as opposed to being installed on equipment located on-premises. As a result, computing environments are moving into the cloud as well. In a true cloud computing environment, the applications would run solely in the cloud. However, hybrid cloud distributed systems have come into use where some services are located in the cloud and some services remain on-premises. In a hybrid cloud distributed system in use in a contact center environment or an enterprising environment, for example, outbound communications may be updated from the onset of the communication. The cloud application acts as an initiator with information relayed from the start of the communication. With inbound communications to the system, the origination is a first party device which may requires a data store lookup for the information associated with the device. Information associated with inbound communications is capable of rapid change and needs to be kept up to date. Traditional methods, such as reverse white page lookups and customer database lookups on-premises, are not as efficient or current as reverse. White pages can quickly become out of date as can customer database lookups on-premises.

The embodiments disclosed herein allow for updated contact-ID information to be used on a distributed set of appliances and devices from a cloud data store where customer records allow for a more granular match or customized name. In addition, communication delivery is not delayed to devices while allowing for updates with more accurate contact-ID information. The number of network messages needing to be sent over the WAN and LAN networks are also minimized while accommodating for updates across the system.

FIG. 1 is a diagram illustrating an embodiment of a hybrid cloud distributed system, indicated generally at 100. A hybrid cloud distributed system might be present in a contact center environment or another environment such as an enterprise environment. In an embodiment, larger environments and organizations employ a hybrid system because it affords more durability to survive intermittent outages of services, such as the Internet. Components of a hybrid cloud distributed system might include a telephony device associated with a first party 105, a telephony device carrier 110, a plurality of cloud managed telephony network appliances 115, a cloud managed application 120, and a device associated with a second party 125.

A telephony device associated with a first party, or alternatively, first party device, 105 comprises a telecommunications device which may be used to place an inbound communication, such as a phone (e.g., SIP, mobile). The first party device 105 has identifying information associated with it, such as a phone number and a customer name, to name a few non-limiting examples. The first party device 105 may also be associated with a user, or first party, who places the communication and user records which correspond to the first party. In an embodiment, the first party device 105 may also be an IP based phone, such as a SpectraLink Wifi phone or a WebRTC softphone.

The first party device 105 is operatively coupled (e.g., wired or wirelessly) to a telephony device carrier 110. In an embodiment, the first party device 105 may be coupled to the telephony device carrier 110 over an IP network. The telephony device carrier 110 comprises a communication services provider, such as a telephone company. The telephony device carrier 110 communicates via a connection (e.g. a trunk connection) with at least one of the plurality of cloud managed telephony network appliances 115 in the hybrid cloud distributed system.

Figure 2:
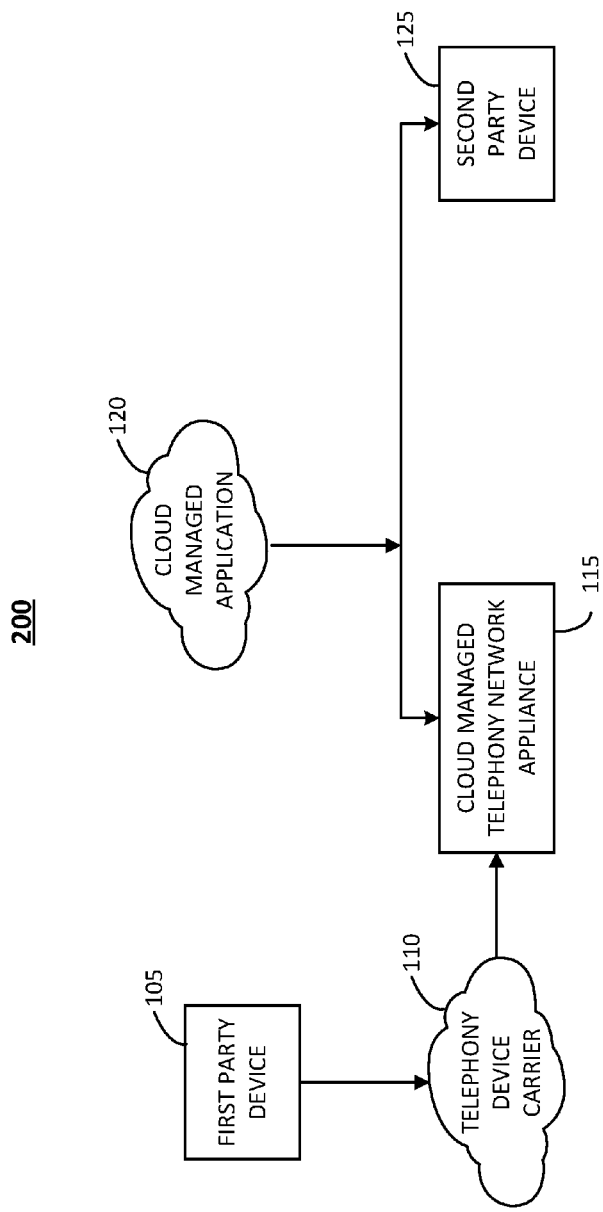
FIG. 2 is a diagram illustrating a hybrid cloud distributed system.

The cloud managed telephony network appliance 115 comprises a multi-purpose appliance which is capable of managing SIP processing in an environment such as a contact center or enterprise system. An example of a cloud managed telephony network appliance 115 might comprise Interactive Intelligence Group, Inc.'s Interaction Edge™ device. In this non-limiting example, for simplicity, only two appliances 115a and 115b are illustrated though it is within the scope of the embodiments for any number of appliances 115 to be present. Optionally, a single appliance 115 may be used. FIG. 2 is a diagram illustrating another embodiment of a hybrid cloud distributed system, indicated generally at 200. FIG. 2 further illustrates a hybrid cloud distributed system comprising a single cloud managed telephony network appliance 115. The process of how a single appliance system functions is described below in greater detail in the process 500, illustrated generally in FIG. 5. Cloud managed telephony network appliances 115 may also comprise data stores. The data stores may comprise directories or Customer Relationship Management (CRM) plug-ins (e.g., Salesforce). Additionally, data stores may comprise a reverse white pages lookup or other means of locally storing information.

The plurality of cloud managed telephony network appliances 115 may be incorporated into groupings where a plurality may be interconnected through a network such as a LAN, or connected in such a way that the appliances are routable to each other. A plurality of the appliances may be utilized in an environment for redundancy and failsafe purposes as well as capacity. In an embodiment, an appliance is capable of running a finite amount of concurrent communications, thus, the number of appliances in a system may be based on a number of users, conferencing capabilities, voicemail capabilities, Interactive Voice Response (IVR), Automatic Communication Distribution (ACD), etc. Each appliance may service a subset of phones and thus, the appliance receiving the communication may not necessarily be the appliance servicing the communication. Appliances 115 may be present on-premises or off-premises, such as in the cloud.

In an embodiment, the appliances may also be operatively coupled to at least one telephony device belonging to a second party 125. The second party device 125 may be present in an environment such as a contact center environment or an enterprise environment. The second party device 125 may further comprise at least a phone and a workstation. In a contact center environment, or another environment such as enterprise setting, a plurality of workstations may be present where agents or other workers perform their duties. The number of workstations present or the equipment associated with a workstation does not necessarily remain constant due to employment fluctuations, equipment changes, or even routine maintenance Each workstation may comprise a communication device coupled to a network (such as a digital network, for example) and a workstation computer. The workstation computer may be coupled to a display. The communication device might comprise a digital telephone which may be associated with the workstation. Additionally, the digital telephone may be integrated into the workstation computer and/or implemented in software. It should be understood that the digital telephone, which is capable of being directly connected to the network, may be in the form of handset, headset, or other arrangement as would occur to those skilled in the art. It shall be further understood that the connection from the network to a workstation can be made first to the associated workstation communication device, then from the workstation communication device to the workstation computer by way of a pass through connection on the workstation communication device. Alternatively, two connections from the network can be made, one to the workstation communication device and one to the workstation computer.

The cloud managed application 120 comprises a unified collaboration and communication application, such as Interactive Intelligence Group, Inc's, PureCloud products suite, to name a non-limiting example. In an embodiment, the cloud managed application 120 may be capable of delivery via stateless, distributed services load balanced across multiple cloud-based datacenters. In another embodiment, the cloud managed application 120 is capable of servicing voice calls.

Figure 3:
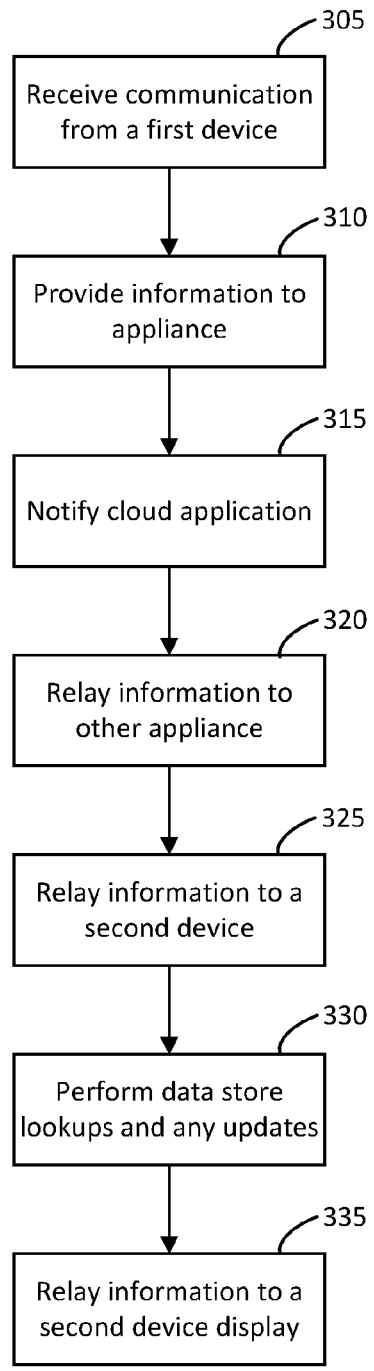
FIG. 3 is a flowchart illustrating a process for passing information in the hybrid cloud distributed system.

FIG. 3 is a flowchart illustrating a process of an embodiment for passing information in the hybrid cloud distributed system, indicated generally at 300. The process 300 may be present in the system 100.

In operation 305, a communication is received from a first device. For example, a first party initiates a communication from an associated device to the system. In an embodiment, this comprises a customer initiating a call into a contact center. In another embodiment, a worker could be initiating a call into an enterprise environment. Control is passed to operation 310 and the process 300 continues.

In operation 310, information is provided to a cloud managed telephony network appliance. For example, the information associated with the first party is provided by the telephony device carrier as a name and phone number to a first cloud managed telephony network appliance, which terminates the Trunk connection. The name of the first party might be blocked and shows up as a generic form such as "Cellular Caller" with city information such as "Indianapolis, Ind.", or contain the caller's name, such as "Betsy Hamilton". The appliance may use this information or may replace it by performing a local data store lookup, such as to a Reverse White Pages, a CRM application plug-in (e.g., salesforce), etc. Control is passed to operation 315 and the process 300 continues.

In operation 315, the cloud application is notified. For example, the first cloud managed telephony network appliance notifies the cloud application of the number of the caller and the latest name information it has, which, in this example, is "Indianapolis, Ind." for Betsy Hamilton. In an embodiment, the notification may be done asynchronously. Sending the notification asynchronously and not waiting on any responses prevents any delay in delivering the communication and the current known information to the telephony device associated with a second party. Control is passed to operation 320 and the process 300 continues.

In operation 320, information is relayed to an other cloud managed telephony network appliance. For example, the first cloud managed telephony network appliance relays the name and number to a second cloud managed telephony network appliance in the grouping of appliances. In an embodiment, the appliance comprises one which the destination phone (e.g., the second party telephony device) is registered to. The second cloud managed telephony network appliance stores the information and may notify the cloud application. Control is passed to operation 325 and the process 300 continues.

In operation 325, information is relayed to a second party device. For example, the second cloud managed telephony network appliance sends the information comprising the name and number to the second party device for display. Control is passed to operation 330 and the process 300 continues.

In operation 330, data store lookups are performed along with any updates. For example, the cloud application performs a data store lookup on the information for any matching or associated records. If the information the cloud application has does not match what the first cloud managed telephony network appliance sent to the cloud application, the cloud application will relay an update message to the first cloud managed telephony network appliance, informing it of the more granular information. In an embodiment, if the first cloud managed telephony network appliance is updated by the cloud application, the appliance will store the information locally and send an update message to the second cloud managed telephony network appliance notifying it of the change Any updates received on the second cloud managed telephony network appliance are relayed to the second party device for update to the display. Control is passed to operation 335 and the process 300 continues.

In operation 335, information is relayed to a second party device display and the process 300 ends. For example, the cloud application will send the information it has on the name, such as "Betsy Hamilton" to the display associated with the second party's device.

Figure 4:
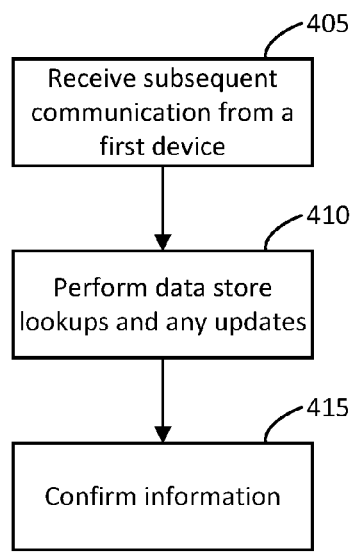
FIG. 4 is a flowchart illustrating a process for subsequent communication attempts of a first party device.

FIG. 4 is a flowchart illustrating a process of an embodiment for information verification with subsequent communication attempts of a first party device, indicated generally at 400. This process may occur in the system 100 and optionally in the system 200.

In operation 405, a subsequent communication is received from the first party device. For example, a first party initiates another communication from a device already associated with the system. In an embodiment, this comprises a customer initiating a call into a contact center. In another embodiment, a worker could be initiating a call into an enterprise environment. Control is passed to operation 410 and the process 400 continues.

In operation 410, data store lookups are performed along with any updates. For example, the first cloud managed telephony network appliance performs a local data store lookup and locates the persisted update for the first party's phone number stored as "Betsy Hamilton" which was received during the process 300. The first cloud managed telephony network appliance uses that information over what was received from the telephony device carrier, trusting that it is a more specific customer record. The cloud application is asynchronously notified by the first cloud managed telephony network appliance of the number of the caller and the latest information it has. The cloud application may perform a data store lookup on the number to determine if a record exists. If the name information it has does not match what was sent by the first cloud managed telephony network appliance, the cloud application will send an update message to the first cloud managed telephony network appliance informing the appliance of the more granular information. If the information matches the current information, then no update is sent to the appliance. Control is passed to operation 415 and the process 400 continues.

In operation 415, information is confirmed and the process ends. For example, the first cloud managed telephony network appliance sends the name and number to the second cloud managed telephony network appliance where the second party device (e.g., the destination phone) is registered to. The second appliance also stores the information and may notify the cloud application. The second appliance may relay the name and number to the second party device for display followed by the cloud application sending the name information it has to the workstation for display.

Figure 5:
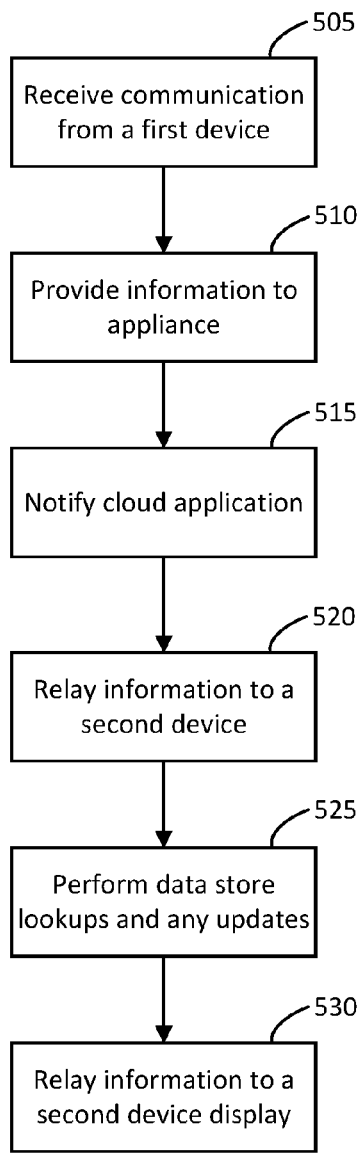
FIG. 5 is a flowchart illustrating a process for passing information in the hybrid cloud distributed system.

In an embodiment where a single cloud managed telephony appliance is utilized, such as the system illustrated in FIG. 2, at 200, the second party device is associated with the appliance receiving the information and communication with the cloud application. This may also be the case in an environment utilizing a plurality of appliances and there is no need to update additional appliances associated with the second party device. In these scenarios, there is no need to notify and update additional cloud managed telephony network appliances and the process 300 becomes more simplified, as exemplified in FIG. 5, illustrated generally at 500. The process 500 may be present in the system 200, illustrated in FIG. 2.

In operation 505, a communication is received from a first device. For example, a first party initiates a communication from an associated device to the system. In an embodiment, this comprises a customer initiating a call into a contact center. In another embodiment, a worker could be initiating a call into an enterprise environment. Control is passed to operation 510 and the process 500 continues.

In operation 510, information is provided to a cloud managed telephony network appliance. For example, the first party's caller-ID information is provided by the telephony device carrier as a name and phone number to the cloud managed telephony network appliance, which terminates the Trunk connection. The name might be blocked and shows up as a generic form such as "Cellular Caller" with city information such as "Indianapolis, Ind.", or contain the caller's name, such as "Betsy Hamilton". The appliance may use this information or may replace it by performing a local data store lookup, such as to a Reverse White Pages, a CRM application plug-in (e.g., salesforce), etc. The cloud managed telephony network appliance stores the information and may notify the cloud application. The appliance may also comprise registration information for the destination phone (e.g., the second party telephony device). Control is passed to operation 515 and the process 300 continues.

In operation 515, the cloud application is notified. For example, the cloud managed telephony network appliance notifies the cloud application of the number of the caller and the latest name information it has, which, in this example, is "Indianapolis, Ind." for Betsy Hamilton. In an embodiment, the notification may be done asynchronously. Sending the notification asynchronously and not waiting on any responses prevents any delay in delivering the communication and the current known information to the telephony device associated with a second party. Control is passed to operation 520 and the process 500 continues.

In operation 520, information is relayed to a second party device. For example, the cloud managed telephony network appliance sends the information comprising the name and number to the second party device for display. Control is passed to operation 525 and the process 500 continues.

In operation 525, data store lookups are performed and any updates are performed. For example, the cloud application performs a data store lookup on the information looks for matching records. If the information the cloud application has does not match what the first cloud managed telephony network appliance sent to the cloud application, the cloud application will relay an update message to the first cloud managed telephony network appliance, informing it of the more granular information. In an embodiment, if the first cloud managed telephony network appliance is updated by the cloud application, the appliance will store the information locally and send an update message to the second cloud managed telephony network appliance notifying it of the change Any updates received on the second cloud managed telephony network appliance are relayed to the second party device for update to the display. Control is passed to operation 530 and the process 500 continues.

In operation 530, information is relayed to a second party device display and the process 500 ends. For example, the cloud application will send the information it has on the name, such as "Betsy Hamilton" to the display associated with the second party's device.

The process 400 remains substantially similar for subsequent communications in a single cloud managed telephony appliance system with the exception of step 415 in the process 400. For the single cloud managed telephony appliance system, there is no second cloud managed telephony appliance to update. Thus, the first cloud managed telephony network appliance stores the information and may notify the cloud application. The appliance may also relay the name and number to the second party device for display followed by the cloud application sending the name information it has to the workstation for display, as opposed to a difference appliance performing this step.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for disseminating information associated with a first telecommunications device, wherein the first telecommunications device is associated with a first party in a telecommunications system, wherein the system further comprises a network coupling a plurality of cloud managed telephony network appliances, a cloud managed application, and a second telecommunications device associated with a second party, the method comprising the steps of:
   a. providing, by a telephony device carrier associated with the first telecommunications device associated with the first party, information associated with the telecommunications device to a first cloud managed telephony network appliance;
   b. notifying, by the first cloud managed telephony network appliance, the cloud application of the information;
   c. relaying, by the first cloud managed telephony network appliance, the information to a second cloud managed telephony network appliance;
   d. storing, by the second cloud managed telephony network appliance, the information provided by the first cloud managed telephony network appliance, and optionally notifying the cloud application;
   e. relaying, by the second cloud managed telephony network appliance, the provided information to the second telecommunications device associated with the second party;
   f. performing, by the Cloud application, a data store lookup on the provided information for existing records, wherein if there are existing records, confirming the provided information with existing records, and wherein, if information does not match, providing by the cloud application, an update to the first cloud managed telephony network appliance; and
   g. sending, by the cloud application, information to a display associated with the second telecommunications device.

2. The method of claim 1, wherein the method further comprises the steps of:
   a. receiving a subsequent communication from the first telecommunications device associated with the first party;
   b. performing, by the first cloud managed telephony network appliance, a data store lookup for updates associated with the first telecommunications device, wherein if the information received from the telephony device carrier differs from the information found by the first cloud managed telephony network appliance in the data store lookup, using the information found by the first cloud managed telephony network appliance;

c. confirming with the cloud application, by the first cloud managed telephony network appliance, that the information found matches the information received, wherein if the information found does not match the information received, sending up to date information to the cloud application; and d. sending, by the cloud application, an update to the second telecommunications device associated with the second party.

3. The method of claim 2, wherein the up to date information comprises most recent information associated with the first party.

4. The method of claim 1, wherein the information comprises at least a name and a phone number associated with the first telecommunications device associated with the first party.

5. The method of claim 3, wherein the information is capable of being altered.

6. The method of claim 1, wherein the data store comprises the first cloud managed telephony network appliance.

7. The data store of claim 6, wherein the data store comprises a cache of an update received from the cloud application.

8. The method of claim 1, wherein the notifying is performed asynchronously.

9. The method of claim 1, wherein the second cloud managed telephony network appliance comprises information associated with a second telecommunications device associated with a second party.

10. The method of claim 1, wherein step (f) further comprises the first cloud managed telephony network appliance providing an update to the second cloud managed telephony network appliance, wherein the second cloud managed telephony network appliance relays the update to the second telecommunications device.

11. A method for disseminating information associated with a first telecommunications device, wherein the first telecommunications device is associated with a first party in a telecommunications system, wherein the system further comprises a network coupling a cloud managed telephony network appliance, a cloud managed application, and a second telecommunications device associated with a second party, the method comprising the steps of:

a. providing, by a telephony device carrier associated with the first telecommunications device associated with the first party, information associated with the telecommunications device to a cloud managed telephony network appliance;

b. notifying, by the cloud managed telephony network appliance, the cloud application of the information;

c. storing, by the cloud managed telephony network appliance, the information;

d. relaying, by the cloud managed telephony network appliance, the provided information to the second telecommunications device associated with the second party;

e. performing, by the cloud managed telephony network appliance, a data store lookup on the provided information for existing records, wherein if there are existing records, confirming the provided information with the existing records, and wherein, if the information does not match the existing records, providing, by the cloud application, an update to the cloud managed telephony network appliance;

f. relaying, by the cloud managed telephony network appliance, the update to the second telecommunications device; and g. sending, by the cloud application, information to a display associated with the second telecommunications device.

12. The method of claim 11, wherein the method further comprises the steps of:

a. receiving a subsequent communication from the first telecommunications device associated with the first party;

b. performing, by the cloud managed telephony network appliance, a data store lookup for updates associated with the first telecommunications device, wherein if the information received from the telephony device carrier differs from the information found by the cloud managed telephony network appliance in the data store lookup, using the information found by the cloud managed telephony network appliance;

c. confirming with the cloud application, by the cloud managed telephony network appliance, that the information found matches the information received, wherein if the information found does not match the information received, sending up to date to the cloud application; and d. sending, by the cloud application, an update to the second telecommunications device associated with the second party.

13. The method of claim 12, wherein the up to date information comprises most recent information associated with the first party.

14. The method of claim 11, wherein the information comprises at least a name and a phone number associated with the first telecommunications device associated with the first party.

15. The method of claim 14, wherein the information is capable of being altered.

16. The method of claim 11, wherein the data store comprises the cloud managed telephony network appliance.

17. The data store of claim 16, wherein the data store comprises a cache of an update received from the cloud application.

18. The method of claim 11, wherein the notifying is performed asynchronously.

19. The method of claim 11, wherein the cloud managed telephony network appliance comprises information associated with a second telecommunications device associated with a second party.

* * * * *